(12) United States Patent
Hung

(10) Patent No.: US 7,552,967 B2
(45) Date of Patent: Jun. 30, 2009

(54) BASE FOR A BICYCLE SADDLE

(75) Inventor: Chun-Fu Hung, Taichung County (TW)

(73) Assignee: Velo Enterprise Co., Ltd., Taichung County (TW)

( * ) Notice: Subject to any disclaimer, the term of this patent is extended or adjusted under 35 U.S.C. 154(b) by 47 days.

(21) Appl. No.: 11/756,252

(22) Filed: May 31, 2007

(65) Prior Publication Data
US 2008/0246245 A1 Oct. 9, 2008

(30) Foreign Application Priority Data
Apr. 4, 2007 (TW) ............................... 96112150 A

(51) Int. Cl.
*B62J 1/00* (2006.01)
(52) U.S. Cl. .............................. 297/195.1; 297/195.13; 280/288.4
(58) Field of Classification Search ................. 280/220, 280/274, 281.1, 283, 288.4; 297/195.1, 195.13, 297/196; 267/131, 132, 133
See application file for complete search history.

(56) References Cited

U.S. PATENT DOCUMENTS

| 6,523,891 B1* | 2/2003 | Yates ........................ 297/202 |
| 6,709,052 B2* | 3/2004 | Jalkanen .................... 297/202 |
| 7,059,672 B2* | 6/2006 | Saccucci .................. 297/195.1 |
| 7,059,673 B1* | 6/2006 | Lee ......................... 297/195.1 |
| 7,249,800 B2* | 7/2007 | Jalkanen .................... 297/201 |
| 2007/0210624 A1* | 9/2007 | Chen et al. .............. 297/195.1 |
| 2007/0290534 A1* | 12/2007 | Rutherford ............... 297/195.1 |

FOREIGN PATENT DOCUMENTS

| DE | 106430 C | 2/1899 |
| EP | 1837271 A | 9/2007 |
| JP | 3128329 | 1/2007 |
| WO | 2006001041 A | 1/2006 |

OTHER PUBLICATIONS

D. R. Fischer et al., "Is the "blooming sign" a promising additional tool to determine malignancy in MR mammography?", Eur. Radiol., vol. 14, pp. 394-401, 2004.

* cited by examiner

*Primary Examiner*—Paul N Dickson
*Assistant Examiner*—Marc A Scharich
(74) *Attorney, Agent, or Firm*—Browdy and Neimark, P.L.L.C.

(57) ABSTRACT

A base for a bicycle saddle includes a body having a narrow anterior portion, a wider posterior portion, a longitudinal axis dividing the body into a right portion and a left portion, and an opening extending along the longitudinal axis of the body. Two supporting plates extend respectively and downwardly from the underside of each of the portions of the body in such a way that two cushion means are defined under the body. A coupling member is disposed on a free end of each of the supporting plates and corresponds to the opening to define an open receiving room between the two supporting plates for receiving means for coupling the base to a bicycle frame.

10 Claims, 6 Drawing Sheets

BASE FOR A BICYCLE SADDLE

BACKGROUND OF THE INVENTION

1. Field of the Invention

The present invention generally relates to bicycle saddles, particularly to a base especially designed for constructing a bicycle saddle being light-weight yet hardy and in the same time having vibration absorbing and ventilation effect.

2. Description of the Related Art

In general, all prior art bicycle saddles utilize a pair of parallel support rails running longitudinally of the saddle and spaced from its underside to attach to the bicycle seat post. The rails are typically made of metal such as aluminum, steel, titanium, or the like and engaged and held in place by appropriate mounting hardware associated with the bicycle seat post.

A disadvantage of the prior art saddles is that the rails tend to bend in use, so that the seat eventually goes out of alignment. Also, the attachment brackets for the rails interfere with the aerodynamic flow of air under the saddle. In addition, for utilizing the rails and the attachment brackets, the weight of the prior art bicycle saddles can not be effectively reduced.

Currently, Japan Utility Model No. 3128329 discloses a solution to resolve the disadvantages of the prior art mentioned above in which a hollowed mounting portion disposed on the underneath side of a saddle body presents to easily mount the saddle body on bicycle seat posts without using prior art support rails. The drawback of this solution is that the hollowed mounting portion is too rigid to effectively absorb vibrations produced during bicycle riding.

Consequently, there is a need for a new bicycle saddle that provides high strength/low weight characteristics, while increasing vibration absorbing and ventilation effect thereof.

SUMMARY OF THE INVENTION

A base for a bicycle saddle in accordance with the present invention generally includes a body having a relatively narrow anterior portion which fits between a bicycle rider's crotch, a relatively wider posterior portion for supporting a bicycle rider's buttocks, a longitudinal axis dividing the body into a right portion and a left portion, and an opening extending along the longitudinal axis of the body.

The base also has a left supporting member extending downwardly from an underside of the left portion of the body in such a way that a left cushion means is formed when the base is mounted on a bicycle frame to absorb the shock and vibration produced during bicycle riding.

The base further includes a right supporting member extending downwardly from an underside of the right portion of the body in such a way that a right cushion means is formed when the base is mounted on a bicycle frame to absorb the shock and vibration produced during bicycle riding.

The base, in addition, includes a coupling member disposed on a free end of each of the supporting members in such a way that it corresponds to the opening to define an open receiving room between the right and left supporting members for receiving means for coupling said base to a bicycle frame.

As described above, the novel base can be mounted on a bicycle frame without prior art support rails so that the weight of a bicycle saddle with the base herein disclosed is effectively reduced. In addition, the base has two supporting members each of which defines a cushion means so that a bicycle saddle with the base herein disclosed would provide high strength/low weight characteristics, while increasing vibration absorbing effect thereof.

BRIEF DESCRIPTION OF THE DRAWINGS

The present invention may be more clearly understood with reference to the following detailed description, in conjunction with the appended drawings of which.

DETAILED DESCRIPTION OF THE PRESENT INVENTION

Figure 1:
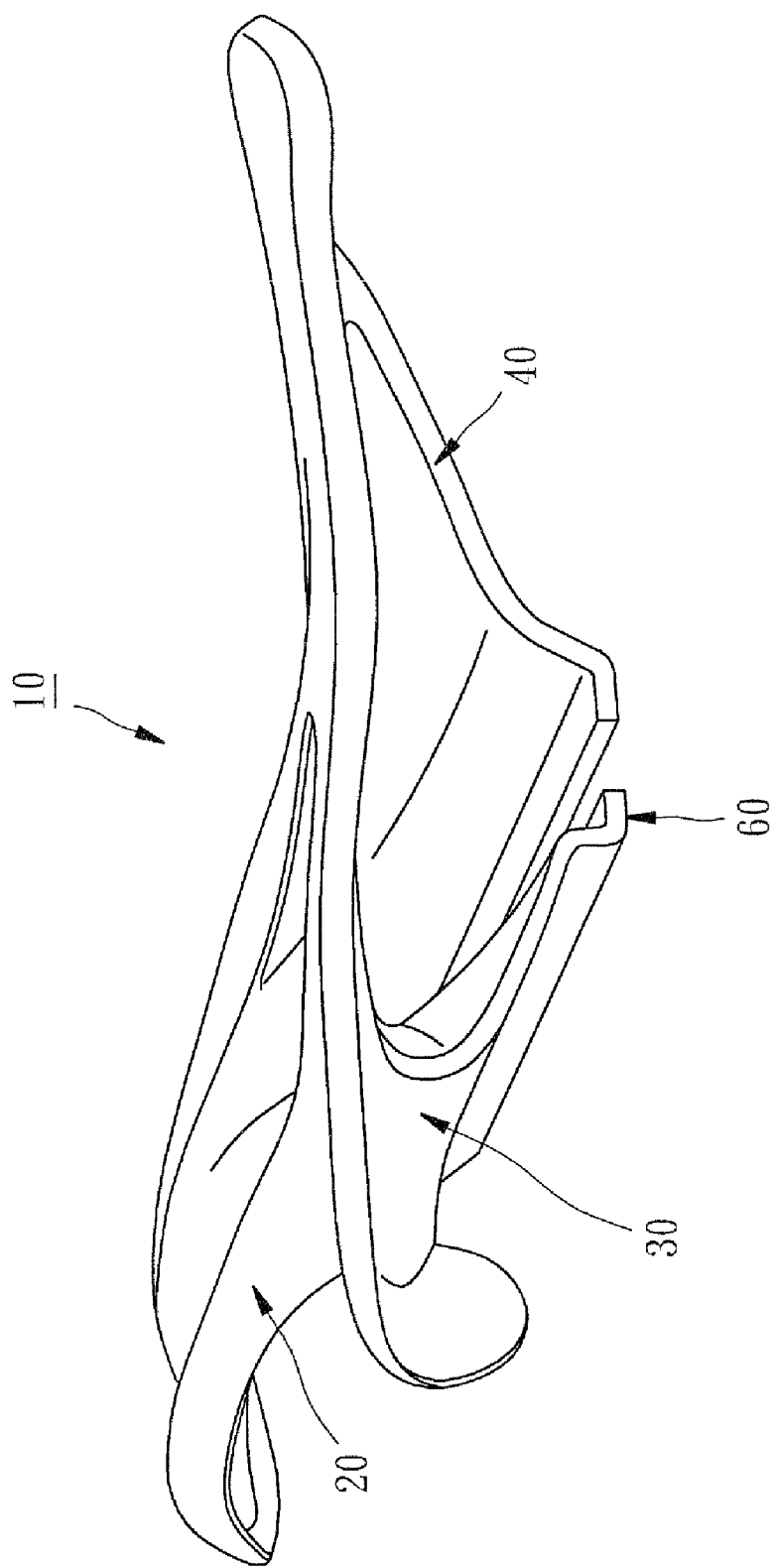
FIG. 1 is a perspective view of a preferred embodiment of a base according to the present invention.
Figure 2:
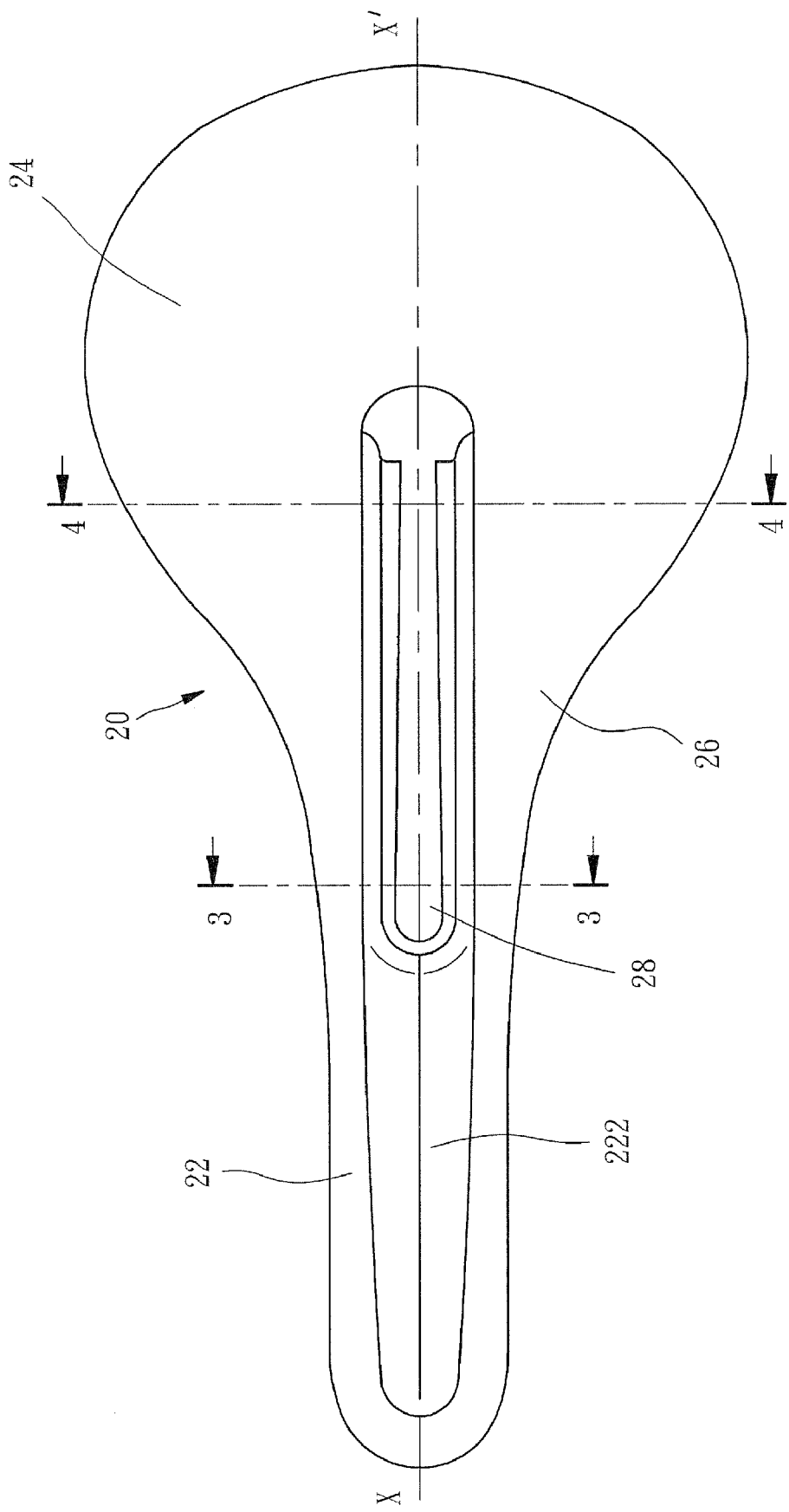
FIG. 2 is a top view of the embodiment shown in FIG. 1.
Figure 4:
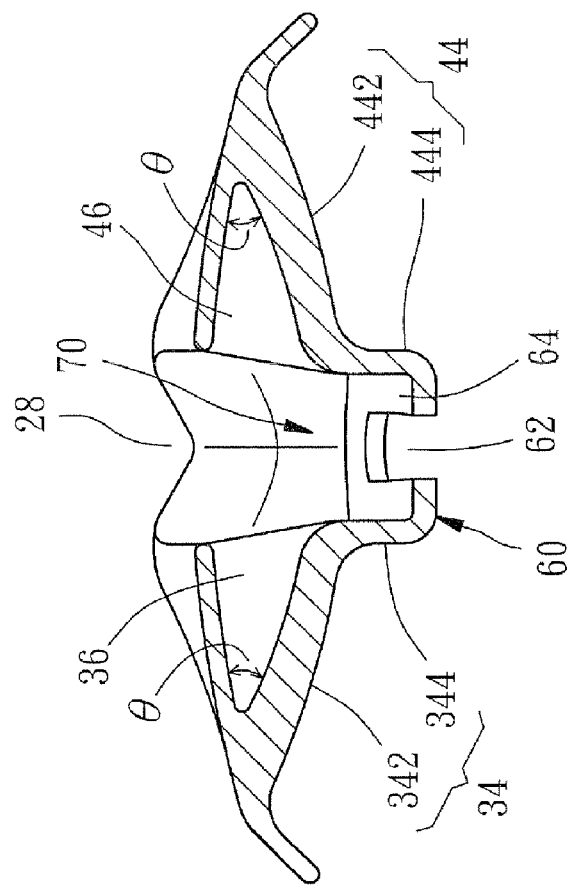
FIG. 4 is a cross-sectional view taken along the line 4-4 of FIG. 2.
Figure 3:
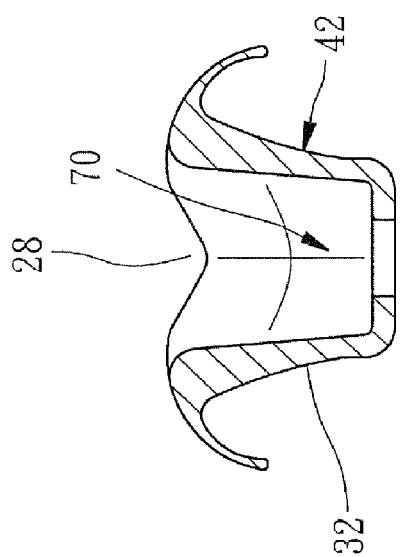
FIG. 3 is a cross-sectional view taken along the line 3-3 of FIG. 2.
Figure 5:
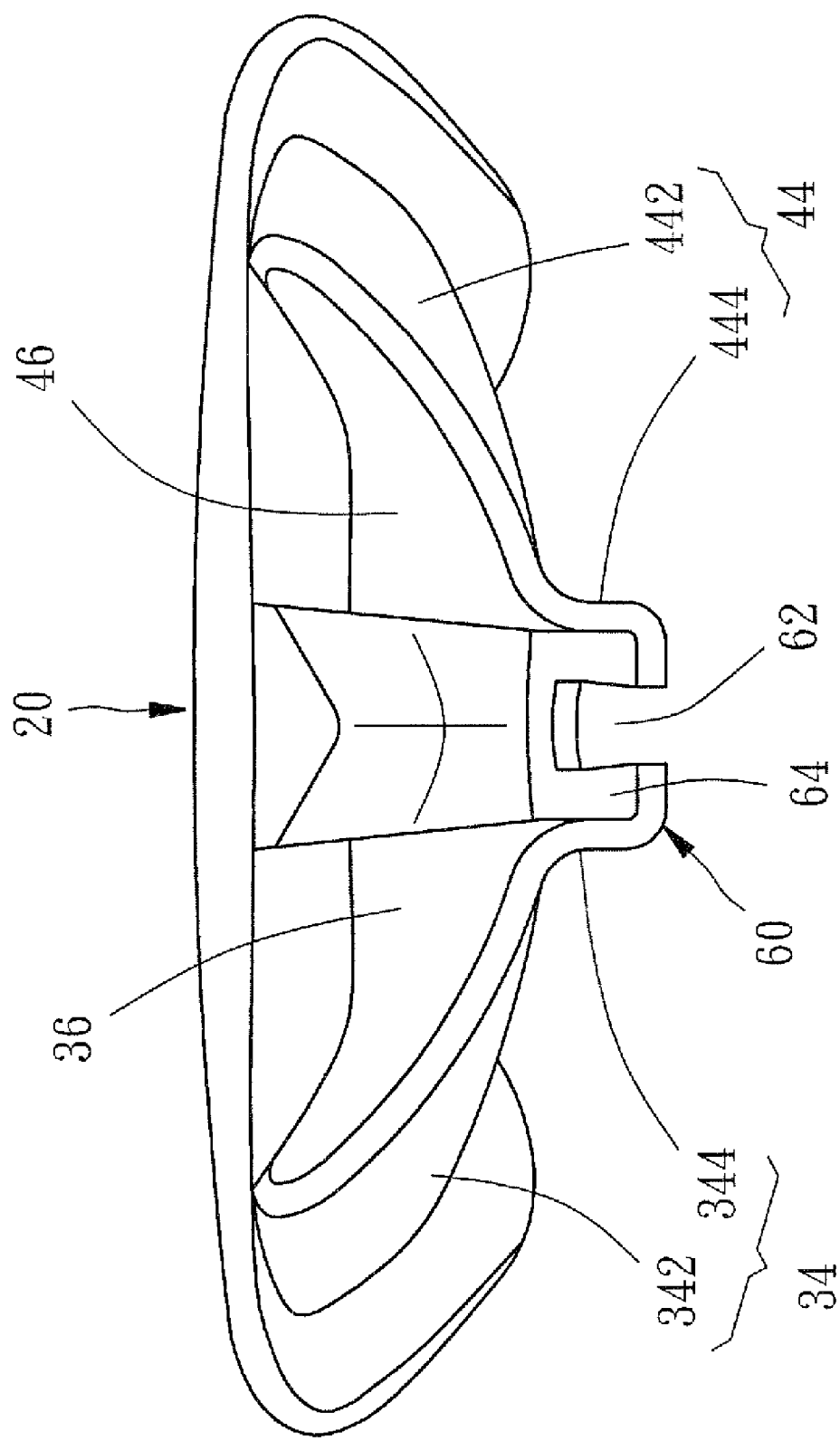
FIG. 5 is a back view of the embodiment shown in FIG. 1.

With reference to FIG. 1, there is shown a base 10 for a bicycle in accordance with the present invention, which generally includes a body 20, left and right supporting plates 30 and 40 extending from the underside of the base 20, and a bottom plate 60 is connected with the free end of each of the supporting plates 30 and 40. The base 20 typically works as a support of a bicycle saddle and it can be covered by a pad and a covering.

Referring now to FIGS. 2-5, the body 20 has a relatively narrow anterior portion 22 which fits between a bicycle rider's crotch, a relatively wider posterior 24 portion for supporting a bicycle rider's buttocks, a middle portion 26 linking the narrow anterior portion 22 with the wider posterior portion 24, and an opening 28 extending along a longitudinal axis X-X' of the body. In this embodiment, the opening 28 extends along the longitudinal axis X-X' from a later area of the anterior portion 22, through the middle portion 26, to a front area of the wider posterior portion 24. The upper surface of the anterior portion 22 provides a channel 222 extending along the longitudinal axis X-X' of the body 20 and communicating with the front side of the opening 28.

The left supporting plate 30 has a first section 32 near the narrow anterior portion 22 of the body 20 and a second section 34 near the wider posterior portion 24. The first section 32 extends vertically and downwardly from the left side of the opening 28 of the body 20. The second section 34 has a first upper portion 342 and a first lower portion 344. The first upper portion 342 extends downwardly and inwardly from the left edge of the underside of the wider posterior portion 24 in such a way that an included angle θ between the body 20 and the second section 34 is formed to define a space 36 therebetween. The included angle θ, in the embodiment, is about 30-45 degrees. The first lower portion 344 extends vertically and downwardly from the free end of the first upper portion 342 so that a left cushion means is defined by the first upper portion 342 to effectively absorb the shock and vibration produced during bicycle riding. In another embodiment of the present invention, for getting a better shock and vibration absorbing effect, the first upper portion 342 can be wavily shaped.

The right supporting plate 40 has a third section 42 near the narrow anterior portion 22 of the body 20 and a fourth section 44 near the wider posterior portion 24. The third section 42 extends vertically and downwardly from the right side of the opening 28 of the body 20. The fourth section 44 has a second upper portion 442 and a second lower portion 444. The second upper portion 442 extends downwardly and inwardly from the right edge of the underside of the wider posterior portion 24 in such a way that an included angle θ between the body 20 and the second upper portion 442 is formed to define a space 46 therebetween. The included angle θ, in the embodiment, is about 30-45 degrees. The second lower portion 444 extends vertically and downwardly from the free end of the second upper portion 442 so that a right cushion means is defined by the second upper portion 442 to effectively absorb the shock and vibration produced during bicycle riding. In another embodiment of the present invention, as the first upper portion 342, for getting a better shock and vibration absorbing effect, the second upper portion 442 can be wavily shaped.

The bottom plate 60 is connected with the free end of the first lower portion 344 of the left supporting plate 34 and the free end of the second lower 444 of the right supporting plate 44. The bottom plate 60 is located just under the opening 28 such that an open receiving room 70 is defined. The bottom plate 60, in this embodiment, has a cut out 62 and an annular shoulder 64 is defined by the cut out 62.

Figure 6:
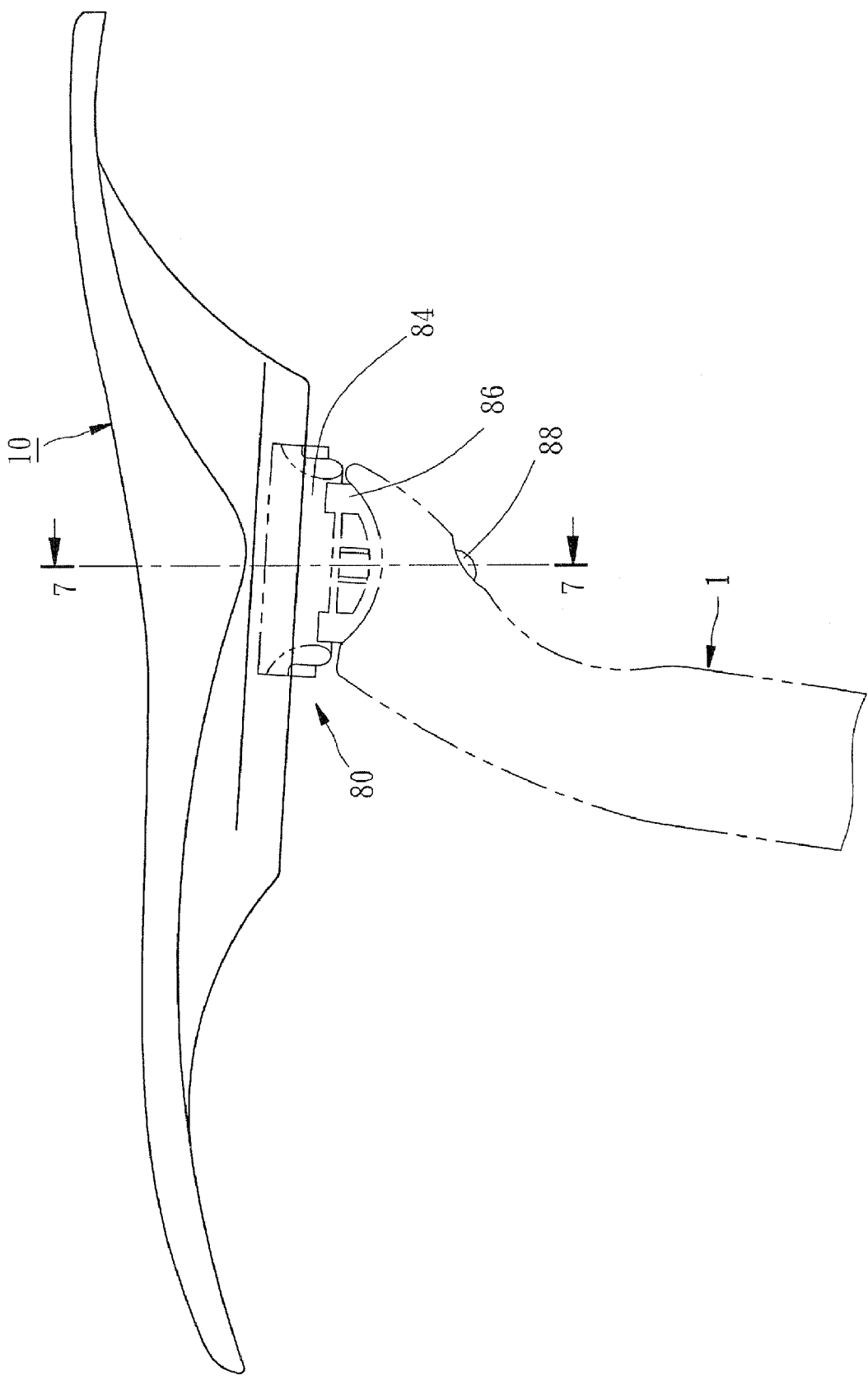
FIG. 6 is a side view showing that the embodiment shown in FIG. 1 mounted on a seat post by a mounting means.
Figure 7:
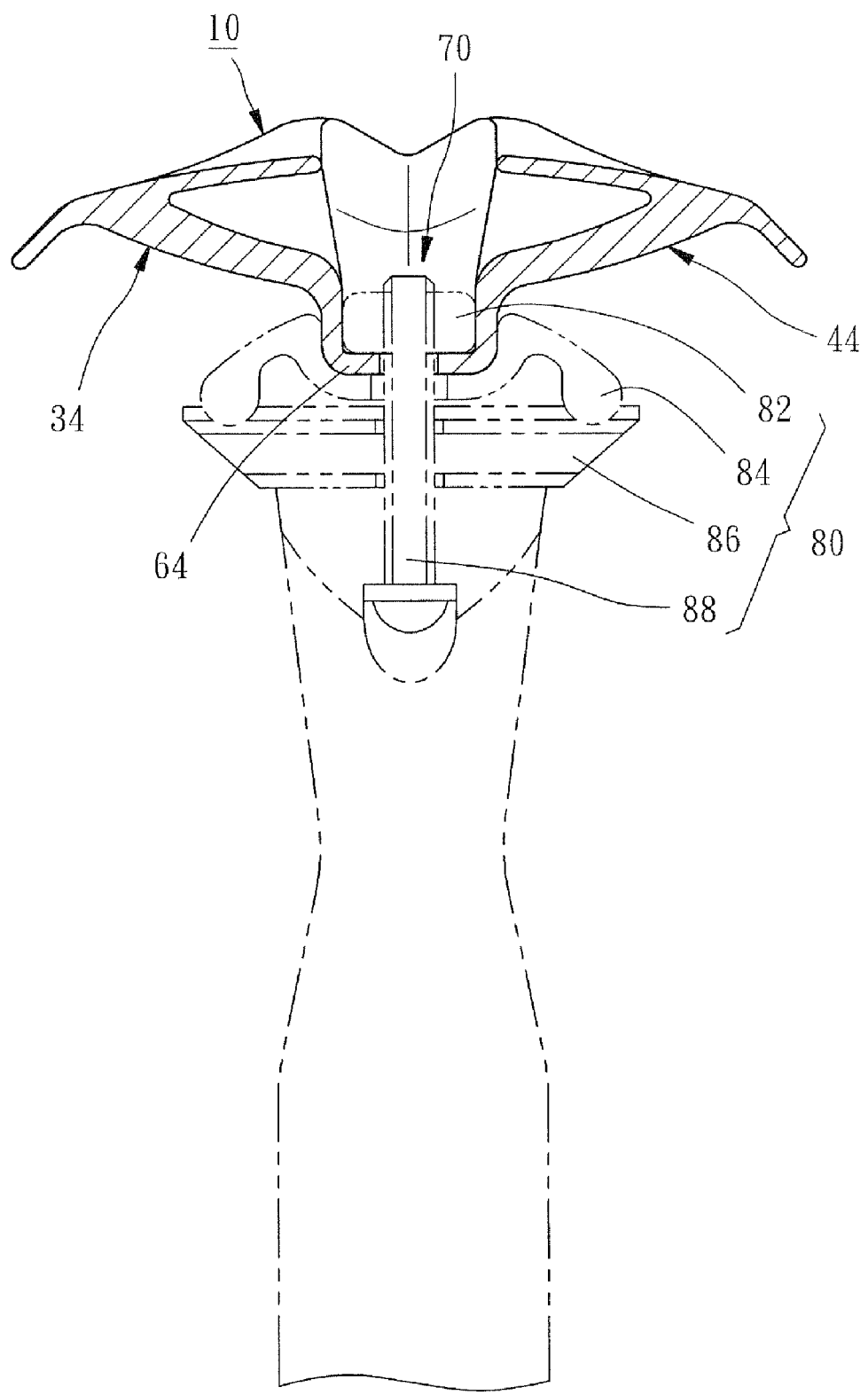
FIG. 7 is a cross-sectional view taken along the line 7-7 of FIG. 6.

Referring lastly to FIG. 6 and FIG. 7, the base 10 is coupled to a bicycle seating post 1 by a mounting means 80. Mounting means 80 includes a nut 82, a fixing plate 84, a connecting plate 86 and a bolt 88. In combination, the nut 82 is received in the receiving room 70 and leans against the shoulder 64 of the bottom plate 60. The fixing plate 84 is placed under the bottom plate 60 and the connecting plate 86 is placed on the top end of the seating post 1 to couple with the fixing plate 84. The bolt 88 passes through the top end of the post 1, the connecting plate 86, the fixing plate 84 and engages lastly with the nut 82. Of course, there may be different ways to couple the base 10 to bicycle seating post. The disclosure herein is just an example. And it must be mentioned that the mounting means is not a feature or element of the present invention and can not be used to limit the scope of the claims of the present invention.

As the construction mentioned above, a bicycle saddle with the base 10 can be coupled with a bicycle seating post without using prior art support rails so that the weight thereof would be outstandingly reduced when comparing with the prior art bicycle saddles. And in the same time, the strength of the base 10 can be reinforced by the supporting plates thereof so that the high strength/low weight characteristics are provided. In addition, because the bicycle saddle constructed by the base 10 can provide two cushion means positioned between the saddle and the bicycle frame, so that the shock and/or vibration transferring from the bicycle frame to the saddle during bicycle riding can be mostly and effectively absorbed thereby. Furthermore, the base 10 has an air distribution passage extending from the front end of the channel 222 on the upper surface of the anterior portion 22, through the opening 20, to the rear end of the open receiving room 70 so that ambient air can flow through the air distribution passage during bicycle riding to provide an effective ventilation.

What is claimed is:

1. A base for a bicycle saddle, comprising:
   a body having a relatively narrow anterior portion for fitting between a bicycle rider's crotch, a relatively wider posterior portion for supporting a bicycle rider's buttocks, a longitudinal axis dividing said body into a right portion and a left portion, and an opening extending along said longitudinal axis of said body;
   a left supporting member extending downwardly from an underside of said left portion of said body;
   said left supporting member including a left supper plate having a first section near said narrow anterior portion and a second section near said wider posterior portion,
   said first section extending vertically and downwardly from a left side of said opening of said body,
   said second section extending downwardly and inwardly from an area located on the underside of said left portion of said body and distanced from said left side of said opening a predetermined distance such that a space is formed between said body and said second section, and
   a left cushion means defined by said second section to absorb shock and vibration produced during bicycle riding;
   a right supporting member extending downwardly from an underside of said right portion of said body; said right supporting member including a right supporting plate having a third section near said narrow anterior portion and a fourth section near said wider posterior portion,
   said third section extending vertically and downwardly from a right side of said opening of said body,
   said fourth section extending downwardly and inwardly from an area located on the underside of said right portion of said body and distanced from said right side of said opening predetermined distance such that a space is formed between said body and said fourth section, and
   a right cushion means defined by said fourth section to absorb shock and vibration produced during bicycle riding; and
   a coupling member disposed on a free end of each of said supporting members in such a way that it corresponds to said opening to define an open receiving room between said right and left supporting members for receiving means for coupling said base to a bicycle frame.

2. The base for a bicycle saddle as claimed in claim 1, wherein said second section of said left supporting plate includes a first upper portion disposed in such a way that an acute angle is defined between said body and said first upper portion.

3. The base for a bicycle saddle as claimed in claim 1, wherein said fourth section of said right supporting plate includes a second upper portion disposed in such a way that an acute angle is defined between said body and said second upper portion.

4. The base for a bicycle saddle as claimed in claim 1, wherein said coupling member includes a bottom plate with a cut out and a shoulder defined by said cut out.

5. The base for a bicycle saddle as claimed in claim 2, wherein said first upper portion of said second section of said left supporting plate is wavily shaped.

6. The base for a bicycle saddle as claimed in claim 3, wherein said second upper portion of said fourth section of said right supporting plate is wavily shaped.

7. The base for a bicycle saddle as claimed in claim 2, wherein said second section of said left supporting plate further includes a first lower portion extending downwardly and vertically from a free end of said first upper portion.

8. The base for a bicycle saddle as claimed in claim 3, wherein said fourth section of said right supporting plate further includes a second lower portion extending downwardly and vertically from a free end of said second upper portion.

9. The base for a bicycle saddle as claimed in claim 1, wherein an upper surface of said narrow anterior portion of said body has a channel extending along said longitudinal axis of said body.

10. The base for a bicycle saddle as claimed in claim 9, wherein said channel of said narrow anterior portion communicates with a front side of said opening.

* * * * *